United States Patent
Joung

(10) Patent No.: US 10,234,577 B2
(45) Date of Patent: Mar. 19, 2019

(54) STABILIZATION METHOD FOR RADIATION DETECTOR

(71) Applicant: NuCare, Inc., Incheon (KR)

(72) Inventor: Jinhun Joung, Incheon (KR)

(73) Assignee: NUCARE, INC. (KR)

( * ) Notice: Subject to any disclaimer, the term of this patent is extended or adjusted under 35 U.S.C. 154(b) by 154 days.

(21) Appl. No.: 15/474,608

(22) Filed: Mar. 30, 2017

(65) Prior Publication Data

US 2018/0149763 A1     May 31, 2018

(30) Foreign Application Priority Data

Nov. 30, 2016   (KR) ........................ 10-2016-0161584

(51) Int. Cl.
    *G01T 7/00*         (2006.01)
    *G01T 1/203*       (2006.01)
    *G01T 1/40*         (2006.01)

(52) U.S. Cl.
    CPC .............. *G01T 7/005* (2013.01); *G01T 1/203* (2013.01); *G01T 1/40* (2013.01)

(58) Field of Classification Search
    CPC ........... G01T 1/203; G01T 1/40; G01T 7/005; G01T 7/00
    See application file for complete search history.

(56) References Cited

U.S. PATENT DOCUMENTS

| | | | |
|---|---|---|---|
| 4,256,960 A | | 3/1981 | Snider |
| 4,611,117 A | * | 9/1986 | Seibert ...................... G01T 1/40 |
| | | | 250/252.1 |
| 4,857,722 A | | 8/1989 | Kumazawa et al. |
| 5,218,202 A | * | 6/1993 | Evers ..................... G01F 23/288 |
| | | | 250/252.1 |
| 5,550,377 A | | 8/1996 | Petrillo et al. |
| 5,677,536 A | | 10/1997 | Vickers |
| 7,297,957 B1 | | 11/2007 | Vickers |
| 8,426,827 B2 | | 4/2013 | Cahill |
| 9,465,119 B2 | | 10/2016 | Manslow et al. |

(Continued)

FOREIGN PATENT DOCUMENTS

| KR | 1020100033175 A | 3/2010 |
|---|---|---|
| KR | 1020160060208 A | 5/2016 |

OTHER PUBLICATIONS

Pausch, Guntram et al., Characterization and Calibration of Large-Volume PVT Detectors by Backscatter Gating, Conference record, 2011, pp. 2214-2219, No. 52-7, IEEE Nuclear Science Symposium Conference, New York, NY.

(Continued)

*Primary Examiner* — Marcus H Taningco
(74) *Attorney, Agent, or Firm* — Levenfeld Pearlstein, LLC

(57) ABSTRACT

The present invention relates to a stabilization method of a plastic scintillator-based radiation detector of the present invention, wherein the Compton edge of K-40 that exists in the spectrum of a background radiation that reacts with the plastic scintillator is converted into a peak form through a proper signal process, and the output calibration of the detector is automatically performed in real time by using the information. Thus, the output of the plastic scintillator-based radiation detector is automatically calibrated in order to thereby stabilize the output of the detector regardless of the external environmental changes.

11 Claims, 3 Drawing Sheets

(56) References Cited

U.S. PATENT DOCUMENTS

2010/0301198 A1* 12/2010 Berheide ................ G01T 1/202
250/252.1
2011/0192979 A1* 8/2011 Cahill .................... G01T 1/202
250/362

OTHER PUBLICATIONS

Siciliano, E.R. et al., Energy calibration of gamma spectra in plastic scintillators using Compton kinematics, Journal, 2008, pp. 232-243, No. A 594, Elsevier, Amsterdam, Netherlands.

Kudomi, N., Energy calibration of plastic scintillators for low energy electrons by using Compton scatterings of gamma rays, Research journal, 1999, pp. 96-99, No. A 430, Elsevier, Amsterdam, Netherlands.

* cited by examiner

STABILIZATION METHOD FOR RADIATION DETECTOR

BACKGROUND OF THE INVENTION

1. Field of the Invention

The present invention relates to a stabilization method of a radiation detector. More specifically, the present invention relates to a stabilization method of a plastic scintillator-based radiation detector.

2. Description of the Prior Art

As is well-known, a radiation detector is a device to find out the presence of radiation, and practical radiation detectors that are currently used may encompass: the Geiger-Muller counter type of radiation detector that utilizes the ionization reaction; the semiconductor type of radiation detector; the scintillation counter type of radiation detector that utilizes the fluorescent reaction; the film badge type of radiation detector that utilizes the photograph reaction; and the glass dosimeter type of radiation detector that utilizes the chemical reaction.

Scintillators that are used for the scintillation counter type of radiation detector are divided into inorganic compounds and organic compounds depending on the type of material used for the same, or are divided into a gas state, a liquid state, and a solid state (a crystal and plastic dispersion type) depending on the state thereof.

In general, the scintillator crystal of the inorganic compound is suitable for the measurement of a y-ray because its density is large, and has a large fluorescent efficiency and a long decay time. In addition, the scintillator of the organic compound is excellent in that it has a short decay time, but it is difficult to manufacture a big single crystal. Furthermore, a liquid scintillator of the organic compound is used when a large scintillator is needed. In recent years, a plastic scintillator has been used by using a polymer of organic compounds in order to eliminate the inconvenience of using the liquid scintillator.

The plastic scintillator represented by polyvinyl toluene (PVT) is generally used in combination with a photo multiplier tube (PMT).

The plastic scintillator reacts with a radiation to then produce photons in proportion to the energy of the radiation. At this time, the produced photons are collected by the photo multiplier tube (PMT) and are converted into an electrical signal to then be amplified. The electrical signal collected and amplified in the photo multiplier tube is signal-processed through a front/rear end electronic circuit to then be stored as data.

The plastic scintillator mainly brings about Compton scattering and results in a negligible quantity of photoelectric absorption when reacting with radiation because of its low density.

Thus, it is difficult to observe a photoelectric absorption peak from the measured spectrum of the plastic scintillator, and most of the measured spectrum shows the gradual Compton scattering signal.

As described above, the plastic-based radiation detector is characterized in that it has a very low energy resolution, in comparison to the radiation detector by using the inorganic scintillator, such as NaI or CsI, or in comparison to the semiconductor type of radiation detector, such as HPGe or CZT.

Nevertheless, the plastic scintillator-based radiation detector is widely used in application fields that require a high sensitivity, such as surveillance of vehicles or conveyor trucks in the airport or harbour, because it is inexpensive and is suitable for manufacturing a large-area detector.

Plastic scintillator-based vehicle surveillance radiation portal systems that are operated in the airports or harbours all over the world are used very widely for tracking and detecting nuclear weapons or radioactive materials that are illegally imported/exported.

However, the plastic scintillator-based vehicle surveillance radiation portal system generates frequent false alarms caused by the degradation of the ability to determine the radionuclides due to the low energy resolution of the plastic scintillator and caused by the instability of the detector that is vulnerable to the external environmental changes, and the secondary precise detection for checking the same requires a high cost and a lot of manpower.

FIG. 3 is a graph showing a result of simulating a reaction relationship between the radiation and the plastic scintillator.

FIG. 3 shows that most of the total radiation reaction is the Compton scattering throughout the entire range of 60 to 2,000 keV in the case of the plastic scintillator[1].

As described above, since no photoelectric absorption peak is observed and most of the spectrum is comprised of gradual and continuous Compton scattering signals, it is impossible to perform the energy calibration or to apply a radionuclide analysis method by using the photoelectric absorption peak that is generally used in the NaI scintillator-based detector or the HPGe scintillator-based detector.

In order to overcome the problems above, a conventional method has been proposed, which performs the energy calibration by using energy information, such as the Compton edge, instead of the photoelectric absorption peak, based on the Compton kinematics, and performs the radionuclide analysis by expanding the same[1-3].

The Compton edge particularly refers to the case where all the energy of a radiation source is transferred to a medium among the Compton scattering {that is, the case of 180-degree scattering (back scatter)}, and an abrupt drop occurs after the Compton edge in the spectrum. This may be shown as Equation 1 and Equation 2 below.

$$E' = \frac{E}{1 + (1 - \cos\theta)\frac{E}{(m_e c^2)}} \quad \text{[Equation 1]}$$

$$E_{Compton} = E_T(\max) = E\left(1 - \frac{1}{1 + \frac{2E}{m_e c^2}}\right) \quad \text{[Equation 2]}$$

Here, E is the energy of the incident photon, and E' is the energy of the outgoing photon, which escapes from the material. $m_e$ is the mass of the electron, and c is the speed of light. In addition, $\theta$ is the angle of deflection for the photon.

Among the prior patent documents, the prior patents [4] and [5] have proposed the spectrum analysis by using the Compton edge. Particularly, the document [4], which is patent-pending, has proposed a method that: applies an energy weight by multiplying the collected spectrum by the energy to switch the same into an energy-weighted spectrum; and converts the Compton edge into a peak form in order to thereby identify the Compton edge more accurately, and has proposed a method for performing the radionuclide analysis by using the same.

However, another problem of the plastic scintillator-based detector is that the position of the Compton edge shifts with respect to a radiation of the same radionuclide because the detector is sensitive to external environmental changes, such as a dose rate of a gamma ray that reacts with the detector or the temperature. In this case, the spectroscopy or radionuclide analysis by using the Compton edge may bring about errors.

As described above, the shift of the position of the photon peak due to the external environment is an old problem of the radiation detector. In order to solve the problem, many patents and papers have been proposed over a long period of time.

The prior patent documents [6] to [11] also describe some of them. Most of them relate to the energy calibration or stabilization with respect to a radiation imaging system that is referred to as a gamma camera that is used in the nuclear medicine.

These mainly disclose a method for making a calibration when a plurality of photo multiplier tube (PMT) signals are not synchronized or when there is a difference in a gain from each other in the detector in which a wide flat plate NaI-based scintillator and a plurality of photo multiplier tubes (PMTs) are connected in the form of an array, or disclose methods for making a calibration when the signal of the photo multiplier tube moves.

In summary, most of the prior patents relate the synchronization between the flat plate detector, such as NaI, and a plurality of PMT signals.

PRIOR ART DOCUMENTS

Non-Patent Documents

[1] G. Pausch et al.; Characterization and calibration of large-volume PVT detectors by Backscatter Gating, IEEE Nu clear Science Symposium Conference Records; 2011 PP 2214-2219.
[2] E. R. Siciliano et al; Energy calibration of gamma spectra in plastic scintillators using Compton kinematics; Nuclear Instruments and Methods in Physics Research A 594. 2008, PP 232-243.
[3] N. Kudomi; Energy calibration of plastic scintillators for low energy electrons by using Compton scattering of gamma rays; Nuclear Instruments and Methods in Physics Research A 430. 1999, PP 96-99.

Patent Document

[4] Korean Patent Publication No. 10-2016-0060208 (published on 3 May 2016)
[5] Korean Patent Publication No. 10-2010-0033175 (Published on 29 Mar. 2010)
[6] U.S. Pat. No. 4,256,960 (registered on 17 Mar. 1981)
[7] U.S. Pat. No. 4,857,722 (registered on 15 Aug. 1989)
[8] U.S. Pat. No. 5,550,377 (registered on 27 Aug. 1996)
[9] U.S. Pat. No. 5,677,536 (registered on 14 Oct. 1997)
[10] U.S. Pat. No. 7,297,957 (registered on 20 Nov. 2007)
[11] U.S. Pat. No. 8,426,827 (registered on 23 Apr. 2013)

SUMMARY OF THE INVENTION

In order to solve the problems above, the objective of the present invention is to provide a stabilization method of a plastic scintillator-based radiation detector for automatically calibrating the output of the plastic scintillator-based radiation detector, which changes with a dose rate of a gamma-ray that reacts with the detector or with the external environment in order to thereby stabilize the output of the detector regardless of the external environmental changes.

In order to attain the objective above, a stabilization method of a plastic scintillator-based radiation detector, according to the present invention, may include the steps of: measuring the spectrum of a background radiation by using a plastic scintillator-based radiation detector; converting the measured background spectrum into a weighted spectrum such that the Compton edge of K-40 is implemented in the form of a peak by signal-processing the same; detecting the channel position of the Compton edge of K-40 from the weighted spectrum; allocating the detected position of the Compton edge of K-40 to a new variable $C_{K40-New}$ to then be defined; determining whether or not a peak shift occurs such that the newly allocated variable $C_{K40-New}$ is out of a predetermined range by comparing the variable $C_{K40-New}$ with a reference value $C_{K40-R}$ stored in a memory (LUT); adjusting the gain of the detector such that $C_{K40-New}$ approximates to $C_{K40-R}$ and belongs to the predetermined range when a peak shift occurs; and endlessly repeating the steps above after the lapse of a specific delay time.

Here, the initially measured background spectrum is preferably converted into the weighted spectrum by multiplying the initially measured background spectrum by the square of a channel value through the equation below, $$\overline{BG}_i = BG_i \times i^2$$

here, $\overline{BG}_i$ is the weighted background spectrum, $BG_i$ is the original background spectrum, and i is a channel value.

In addition, the initially measured background spectrum may be converted into the weighted spectrum by applying a linear or non-linear function to the initially measured background spectrum through Equation below, $$\overline{BG}_i = BG_i \times f(i)$$

here, f(i) is the linear or non-linear function for a channel value.

In addition, a peak search algorithm may be used, which is generally used for a signal process, in the step of detecting the channel position of the Compton edge of K-40 from the weighted spectrum.

In addition, it may be determined whether or not the $C_{k40-new}$ is within an allowable range of the predetermined reference value $C_{k40-R}$ in the step of determining the peak shift.

Here, the reference value $C_{k40-R}$ of K-40 is pre-calculated through an energy calibration to then be stored in a memory.

In addition, preferably, the lower limit value $C_{k40-RL}$ and the upper limit value $C_{k40-RH}$ of the allowable range of the reference value $C_{k40-R}$ may be defined by ±k % based on the reference value $C_{k40-R}$, and k % may be maintained in the range of 2% to 5% of the reference value $C_{k40-R}$.

In addition, the step of adjusting the gain may be performed when the $C_{k40-new}$ does not satisfy $C_{K40-RL} \leq C_{K40-New} < C_{K40-RH}$.

In addition, the plastic scintillator-based radiation detector may include a plastic scintillator, a photo multiplier tube (PMT), and a front/rear end electronic device, and the gain may be adjusted by adjusting a variable resistor for the gain that is included in the front/rear end electronic circuit.

Preferably, the adjustment of the variable resistor may be performed by pre-storing a relationship between the adjustment of the variable resistor and a gain change in a memory through a pre-calculation or experiment thereof.

According to the stabilization method of a plastic scintillator-based radiation detector of the present invention, the Compton edge of K-40 that exists in the spectrum of a background radiation that reacts with the plastic scintillator is converted into a peak form through a proper weighted signal process, and the output calibration of the detector is automatically performed in real time by using the information. Thus, the output of the plastic scintillator-based radiation detector is automatically calibrated in order to thereby stabilize the output of the detector regardless of the external environmental changes.

Furthermore, according to the stabilization method of a plastic scintillator-based radiation detector of the present invention, the stabilization of the detector is automatically performed in real time only by means of the background radiation in nature and the signal processing of the same, and the stabilization is made through a simple change and replacement of the signal processing part while maintaining the PVT scintillator-based radiation portal system that has already been installed. Therefore, it is possible to compensate for the performance of the existing system at a very low cost.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
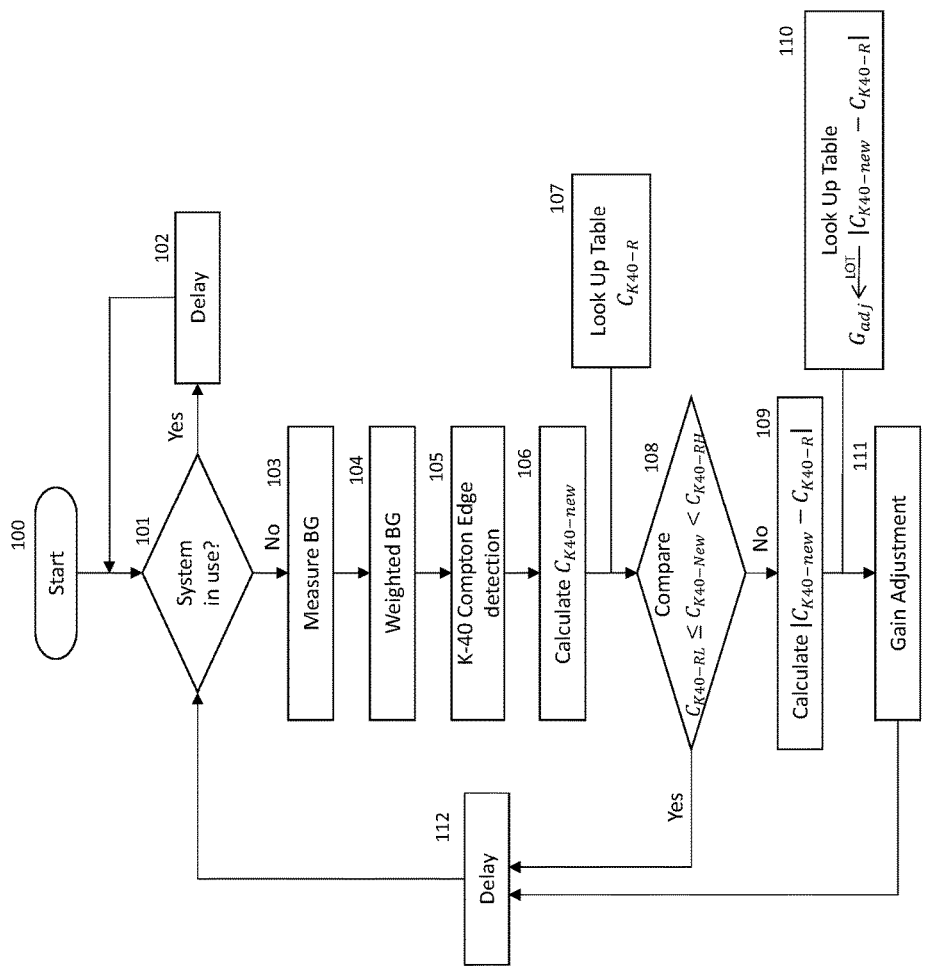
FIG. 1 is a flowchart that schematically illustrates a stabilization method of a plastic scintillator-based radiation detector step by step, according to an embodiment of the present invention.

Hereinafter, the embodiment of the present invention will be described in detail with reference to the accompanying drawings to enable one of ordinary skill in the art to easily execute the present invention. However, the present invention may be implemented in a variety of forms, and is not limited to the embodiment set forth herein. Parts that are not related to the description will be omitted in the drawings in order to clearly describe the present invention, and the same or a similar element will bear the same reference numeral throughout the specification.

FIG. 1 is a flowchart that schematically illustrates a stabilization method of a plastic scintillator-based radiation detector step by step, according to an embodiment of the present invention.

Referring to FIG. 1, the stabilization method of a plastic scintillator-based radiation detector in the present embodiment is configured to include a background spectrum measuring step (103), a weight signal processing step (104), a K-40 Compton edge position detecting step (105), a Compton edge position calculating step (106), a peak movement determining step (108), a gain adjusting step (111), and a step of endlessly repeating the steps above in order to perform a calibration in real time for the stabilization by using K-40 that exists in a background radiation without a separate radiation source for calibration.

Here, the plastic scintillator-based radiation detector is configured to include a plastic scintillator, a photo multiplier tube (PMT), and a front/rear end electronic device.

Basically, the auto-stabilization calibration of the plastic scintillator-based radiation detector is repeatedly performed when the detector system is in the idle state.

Therefore, when the stabilization is started (100), steps (101 and 102) are performed first, wherein: it is determined whether or not the detector system is collecting data or is conducting other operations in the current alarm state (101); if the detector system is conducting other operations, the execution is delayed for a predetermined period of time (102); and, thereafter, the steps (101 and 102) are repeated for determining whether or not the detector system is in use.

When the detector system is not in use, the stabilization calibration is performed. At this time, background spectrum data is collected through the background spectrum measuring step (103). This is due to the fact that the K-40 information necessary for the stabilization is extracted from the background spectrum.

In the weight signal processing step (104), the collected background spectrum (background data) is signal-processed such that the Compton edge of K-40 is converted into a peak form.

A weighted background spectrum is obtained through the signal processing step (104). The weighted background spectrum is defined by Equation 3 below.

$$\overline{BG}_i = BG_i \times i^2 \qquad \text{[Equation 3]}$$

Here, $\overline{BG}_i$ is the weighted background spectrum, and $BG_i$ is the original background spectrum. In addition, i is a channel value.

In addition, the weighted spectrum may be defined by applying a linear or non-linear function to the initially measured background spectrum through Equation 4 below.

$$\overline{BG}_i = BG_i \times f(i) \qquad \text{[Equation 4]}$$

Here, f(i) is the linear or non-linear function for the channel value.

Figure 2:
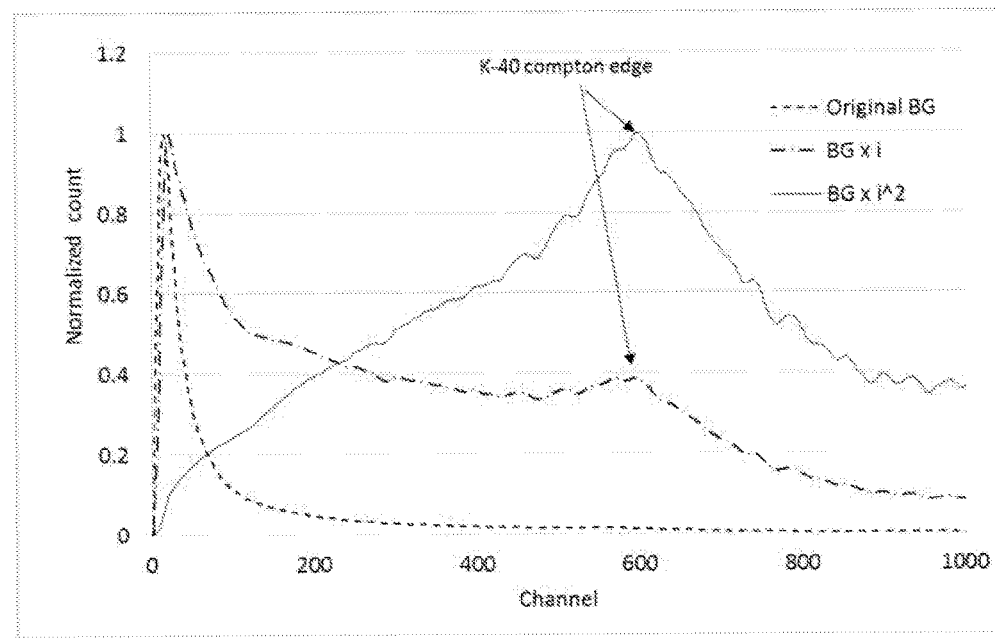
FIG. 2 is a graph in which a weight is applied to the background spectrum.
Figure 3:
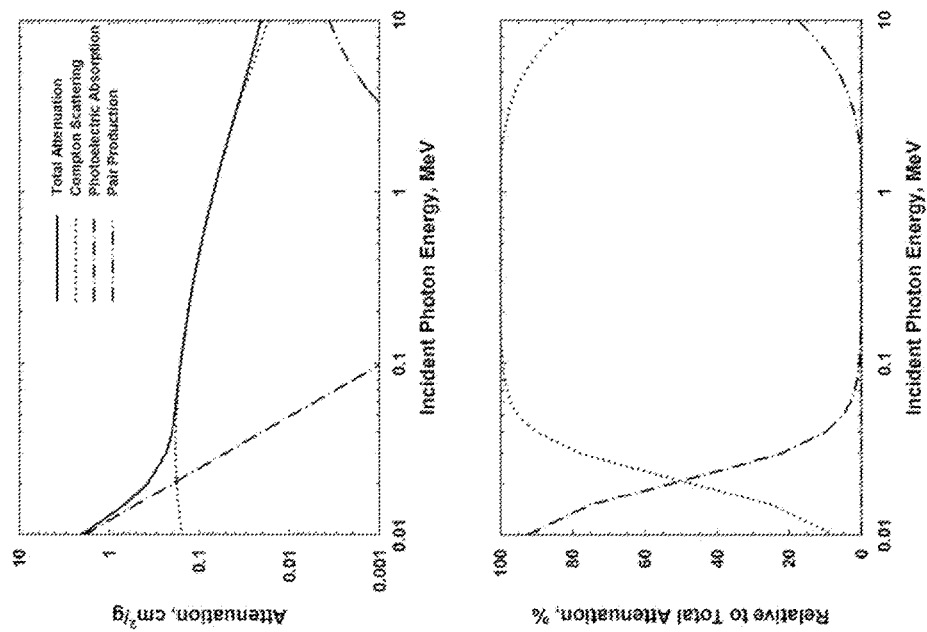
FIG. 3 is a graph showing a simulation result for a reaction relationship between the radiation and the plastic scintillator.

FIG. 2 is a graph in which a weight is applied to the background spectrum.

FIG. 2 is the background spectrum data that is obtained through experiments by using the actual plastic scintillator-based radiation detector, and illustrates the collected background spectrum, the weighted spectrum $\overline{BG}_i = BG_i \times i$, and a spectrum to which Equation 3 is applied, respectively. It can be seen that the case of using Equation 3 highlights the Compton edge of k-40 included in the background radiation in the most distinct peak form.

Therefore, since the square of each channel value is applied as a weight in the weighted background spectrum that is proposed by the present invention, the signal of the Compton scattering in the lower area becomes less, and a relatively high energy area is highlighted so that the Compton edge of k-40 is displayed in the form of an outstanding peak. Here, the Y-axis denotes a normalized count through the division by the maximum value of each graph.

In the K-40 Compton edge position detecting step (105), the position of the Compton edge of K-40 is detected from the background spectrum that is weight-processed by the square of a channel value.

Here, since the Compton edge appears in the form of a peak through the signal processing step (104), the position may be obtained by using algorithms for detecting various peaks, which are generally used for a signal process.

In the Compton edge position calculating step (106), the channel position of the detected Compton edge on the x-axis is defined by allocating $C_{k40\text{-}new}$.

In the peak movement determining step (108), it is determine whether or not $C_{k40\text{-}new}$ that is allocated in the Compton edge position calculating step (106) is within an allowable range of a predetermined reference value $C_{k40\text{-}R}$.

At this time, the lower limit value and the upper limit value $C_{k40\text{-}RH}$ of the allowable range are defined by ±k % based on $C_{k40\text{-}R}$, and, in general, k % is preferably maintained in the range of 2% to 5%.

Here, $C_{k40\text{-}R}$ represents the Compton edge value of K-40 during the optimal operation of the system, and is predetermined through experiments or analysis with respect to the corresponding system to then be pre-stored in memory 1 (107) (look-up table).

If $C_{k40\text{-}new}$ that is calculated through the background spectrum measuring step (103) to the Compton edge position calculating step (106) satisfies $C_{k40\text{-}R}$±k % (that is, $C_{K40\text{-}RL} \leq C_{K40\text{-}New} < C_{K40\text{-}RH}$) that is stored in the memory (107), it is regarded to belong to the stabilization range. Therefore, the sequence proceeds to the step (112) of delaying the operation for a specific period of time without performing any operation.

However, if $C_{k40\text{-}new}$ does not satisfy $C_{K40\text{-}RL} \leq C_{K40\text{-}New} < C_{K40\text{-}RH}$, the gain of the detector is adjusted through the gain adjusting step (111) such that $C_{K40\text{-}New}$ approximates to $C_{K40\text{-}R}$.

At this time, the gain of the detector is changed by adjusting the digital variable resistor included in the detector, and the digital variable resistor value to be adjusted is defined as an appropriate value according to an error between $C_{K40\text{-}R}$ and $C_{K40\text{-}New}$, which is defined through experiments to then be pre-stored in memory 2 (110) (look-up table).

A similar effect may be obtained by adjusting a high voltage applied to the photo multiplier tube (PMT), instead of adjusting the gain of the detector. However, a method for adjusting the high voltage should be carefully selected because it changes the dynamic range as well.

Alternatively, it is possible to use a method for calibrating the digitized spectrum by the corresponding peak shift in a software manner instead of the adjustment of hardware, or to use a method for calibrating the energy calibration information.

Meanwhile, when the gain adjusting step (111) is completed, the stabilization method may be endlessly repeated after the lapse of a delay time (112). The delay time (102 or 112) may be randomly determined.

As described above, in the stabilization method of a plastic scintillator-based radiation detector of the present embodiment, the Compton edge of K-40 that exists in the spectrum of the background radiation that reacts with the plastic scintillator is converted into a peak form through a proper signal process, and the output calibration of the detector is automatically performed in real time by using the information. Thus, the output of the plastic scintillator-based radiation detector is automatically calibrated in order to thereby stabilize the output of the detector regardless of the external environmental changes.

In particular, the stabilization of the detector is automatically performed in real time only by means of the background radiation in nature and the signal processing of the same, and the stabilization is made through a simple change and replacement of the signal processing part while maintaining the PVT scintillator-based radiation portal system that has already been installed. Therefore, it is possible to compensate for the performance of the existing system at a very low cost.

Meanwhile, the stabilization method of the plastic scintillator-based radiation detector, according to the present embodiment, shows only an example for performing a calibration in real time for the stabilization by using K-40 that exists in the background radiation without a separate radiation source for calibration. However, the present invention is not limited thereto, and only if the information necessary for the stabilization is insufficient only with K-40 that exists in the background radiation, specimens, such as KCL, that emit the K-40 radiation may be disposed around the detector.

Although the preferred embodiment of the present invention has been described above, the present invention is not limited thereto, and the present invention may be changed and modified in a variety of forms within a range of the claims, the detailed description of the invention, and the accompanying drawings, which shall fall within the scope of the invention.

What is claimed is:

1. A stabilization method of a plastic scintillator-based radiation detector, the method comprising:
    measuring the spectrum of a background radiation by using a plastic scintillator-based radiation detector;
    converting the measured background spectrum into a weighted spectrum such that the Compton edge of K-40 is implemented in the form of a peak by signal-processing the same;
    detecting the channel position of the Compton edge of K-40 from the weighted spectrum;
    allocating the detected position of the Compton edge of K-40 to a new variable $C_{K40\text{-}New}$ to then be defined;
    determining whether or not a peak shift occurs such that the newly allocated variable $C_{K40\text{-}New}$ is out of a predetermined range by comparing the variable $C_{K40\text{-}New}$ with a reference value $C_{K40\text{-}R}$ stored in a memory (LUT);
    adjusting the gain of the detector such that $C_{K40\text{-}New}$ approximates to $C_{K40\text{-}R}$ and belongs to the predetermined range when a peak shift occurs; and
    endlessly repeating the operations above after the lapse of a specific delay time.

2. The method according to claim 1, wherein the initially measured background spectrum is converted into the weighted spectrum by multiplying the initially measured background spectrum by the square of a channel value through Equation below, $$\widetilde{BG}_i = BG_i \times i^2$$

here, $\widetilde{BG}_i$ is the weighted background spectrum, $BG_i$ is the original background spectrum, and i is a channel value.

3. The method according to claim 1, wherein the initially measured background spectrum is converted into the weighted spectrum by applying a linear or non-linear function to the initially measured background spectrum through the equation below, $$\widetilde{BG}_i = BG_i \times f(i)$$

here, f(i) is the linear or non-linear function for a channel value.

4. The method according to claim 1, wherein a peak search algorithm is used, which is generally used for a signal process, in the detecting of the channel position of the Compton edge of K-40 from the weighted spectrum.

5. The method according to claim 1, wherein it is determined whether or not the $C_{k40\text{-}new}$ is within an allowable range of the predetermined reference value $C_{k40-R}$ in the determining of the peak shift.

6. The method according to claim 5, wherein the $C_{k40-R}$ is pre-calculated through an energy calibration to then be stored in a memory.

7. The method according to claim 5, wherein the lower limit value $C_{k40-RL}$ and the upper limit value $C_{k40-RH}$ of the allowable range of the reference value $C_{k40-R}$ are defined by ±k % based on the reference value $C_{k40-R}$, and k % is maintained in the range of 2% to 5% of the reference value $C_{k40-R}$.

8. The method according to claim 7, wherein the adjusting of the gain is performed when the $C_{k40-new}$ does not satisfy $C_{K40-RL} \leq C_{K40-New} < C_{K40-RH}$.

9. The method according to claim 8, wherein the plastic scintillator-based radiation detector comprises a plastic scintillator, a photo multiplier tube (PMT), and a front/rear end electronic device.

10. The method according to claim 9, wherein the gain is adjusted by adjusting a variable resistor for the gain that is included in the front/rear end electronic circuit.

11. The method according to claim 10, wherein the adjustment of the variable resistor is performed by pre-storing a relationship between the adjustment of the variable resistor and a gain change in a memory through a pre-calculation or experiment thereof.

* * * * *